United States Patent
Reznik et al.

(10) Patent No.: US 12,271,485 B2
(45) Date of Patent: Apr. 8, 2025

(54) DETECTING VULNERABILITIES IN VIRTUAL INSTANCES IN A CLOUD ENVIRONMENT UTILIZING INFRASTRUCTURE AS CODE

(71) Applicant: Wiz, Inc., New York, NY (US)

(72) Inventors: Roy Reznik, Tel Aviv (IL); Yinon Costica, Tel Aviv (IL); Osher Hazan, Mazkeret Batia (IL); Raaz Herzberg, Tel Aviv (IL)

(73) Assignee: Wiz, Inc., New York, NY (US)

( * ) Notice: Subject to any disclaimer, the term of this patent is extended or adjusted under 35 U.S.C. 154(b) by 348 days.

(21) Appl. No.: 17/820,433

(22) Filed: Aug. 17, 2022

(65) Prior Publication Data
US 2023/0069334 A1   Mar. 2, 2023

Related U.S. Application Data

(60) Provisional application No. 63/239,190, filed on Aug. 31, 2021.

(51) Int. Cl.
G06F 21/56 (2013.01)
G06F 21/57 (2013.01)

(52) U.S. Cl.
CPC .......... *G06F 21/577* (2013.01); *G06F 21/568* (2013.01)

(58) Field of Classification Search
CPC .............................. G06F 21/577; G06F 21/568
See application file for complete search history.

(56) References Cited

U.S. PATENT DOCUMENTS

| | | | |
|---|---|---|---|
| 10,255,370 B2 | 4/2019 | Carpenter et al. | |
| 10,360,025 B2 | 7/2019 | Foskett et al. | |
| 10,412,103 B2 | 9/2019 | Haugsnes | |
| 10,831,898 B1 | 11/2020 | Wagner | |
| 11,099,976 B2 | 8/2021 | Khakare et al. | |
| 2007/0261112 A1* | 11/2007 | Todd | H04L 63/1483 726/2 |
| 2020/0387357 A1* | 12/2020 | Mathon | G06F 9/4411 |
| 2021/0099478 A1* | 4/2021 | Seetharamaiah | H04L 63/1433 |
| 2022/0067174 A1* | 3/2022 | Gupta | G06F 21/566 |

* cited by examiner

*Primary Examiner* — Khoi V Le
(74) *Attorney, Agent, or Firm* — M&B IP Analysts, LLC

(57) ABSTRACT

A system and method for detecting a vulnerable workload deployed in a cloud environment based on a code object of an infrastructure as code file utilizes a security graph. The method includes: extracting the code object from a state file, which includes a mapping between the code object to a first deployed workload and a second deployed workload; generating a node representing the code object in the security graph; generating a connection in the security graph between the node representing the code object and a node representing the first workload and a connection between the node representing the code object and a node representing the second workload; and determining that the second workload is a vulnerable workload, in response to detecting that the first workload node is associated with a cybersecurity threat, and that the nodes representing the workloads are each connected to the node representing the code object.

17 Claims, 7 Drawing Sheets

DETECTING VULNERABILITIES IN VIRTUAL INSTANCES IN A CLOUD ENVIRONMENT UTILIZING INFRASTRUCTURE AS CODE

CROSS-REFERENCE TO RELATED APPLICATIONS

This application claims the benefit of U.S. Provisional Application No. 63/239,190 filed on Aug. 31, 2021, the contents of which are hereby incorporated by reference.

TECHNICAL FIELD

The present disclosure relates generally to threat detection in cybersecurity, and specifically to threat detection in cloud entities deployed utilizing infrastructure as code.

BACKGROUND

Cloud computing environments, such as those provided by Amazon® Web Services (AWS), Google® Cloud Platform (GCP), and the like, provide numerous advantages, mainly the ability to abstract physical hardware into virtual instances which can be provisioned to different users and for different purposes, thereby increasing the usability of a physical machine or resource. Virtual instances (i.e., workloads) such as virtual machines, containers, and serverless functions, are popular virtualizations of such environments.

As cloud computing evolves, various improvements are introduced in order to better provision hardware resources. This is advantageous as it allows to provide a service to as many users as possible, fully utilize a hardware resource, and generate returns for the cloud platform provider.

On such technology which allows fast deployment of workloads in a cloud computing environment is known as Infrastructure as code (IaC). Utilizing IaC, provisioning compute resources in a cloud computing environment is done based on definition files which are preconfigured, and when executed cause the cloud computing environment to deploy various workloads, cloud entities, and the like. IaC solutions are provided for example by Chef®, Puppet®, Terraform® and the like. Such IaC solutions allow generating a declaratory code, based on which a deployment engine generates instructions that when executed in a cloud computing environment, for example by an orchestrator, cause cloud entities such as virtual machines, to be deployed in the cloud computing environment. This is beneficial, for example, as it allows to easily create a template from which variations of a virtual machine may be generated without having to program a virtual machine from scratch for every single deployed instance.

However, code is still written by humans and as such is prone to errors and may include vulnerabilities. This may result in a compromised workload, or worse, in a large number of compromised workloads, where a single template is utilized to deploy many virtual workloads.

It would therefore be advantageous to provide a solution that would overcome at least the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for detecting a vulnerable workload deployed in a cloud computing environment based on a code object of an infrastructure as code (IaC) file utilizing a security graph. The method comprises: extracting a code object, of a deployment code, from a state file, the state file including a mapping between the code object to a first workload deployed in the cloud computing environment and a second workload deployed in the cloud computing environment; generating a node representing the code object in the security graph, wherein the security graph includes a representation of the cloud computing environment; generating a connection in the security graph between the node representing the code object and a node representing the first workload; generating a connection in the security graph between the node representing the code object and a node representing the second workload; and determining that the second workload is a vulnerable workload which includes a cybersecurity threat, in response to detecting that the first workload node is associated with a cybersecurity threat, and that the node representing the second workload and the node representing the first workload are each connected to the node representing the code object.

Certain embodiments disclosed herein also include a non-transitory computer readable medium having stored thereon causing a processing circuitry to execute a process, the process comprising: extracting a code object, of a deployment code, from a state file, the state file including a mapping between the code object to a first workload deployed in the cloud computing environment and a second workload deployed in the cloud computing environment; generating a node representing the code object in the security graph, wherein the security graph includes a representation of the cloud computing environment; generating a connection in the security graph between the node representing the code object and a node representing the first workload; generating a connection in the security graph between the node representing the code object and a node representing the second workload; and determining that the second workload is a vulnerable workload which includes a cybersecurity threat, in response to detecting that the first workload node is associated with a cybersecurity threat, and that the node representing the second workload and the node representing the first workload are each connected to the node representing the code object.

Certain embodiments disclosed herein also include a system for detecting a vulnerable workload deployed in a cloud computing environment based on a code object of an infrastructure as code (IaC) file utilizing a security graph. The system comprises: a processing circuitry; and a memory, the memory containing instructions that, when executed by the processing circuitry, configure the system to: extract a code object, of a deployment code, from a state file, the state file including a mapping between the code object to a first workload deployed in the cloud computing environment and a second workload deployed in the cloud computing environment; generate a node representing the code object in the security graph, wherein the security graph includes a representation of the cloud computing environment; generate a connection in the security graph between the node representing the code object and a node representing the first workload; generate a connection in the security graph between the node representing the code object and a node representing the second workload; and determine that the second workload is a vulnerable workload which includes a cybersecurity threat, in response to detecting that the first workload node is associated with a cybersecurity threat, and that the node representing the second workload and the node representing the first workload are each connected to the node representing the code object.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
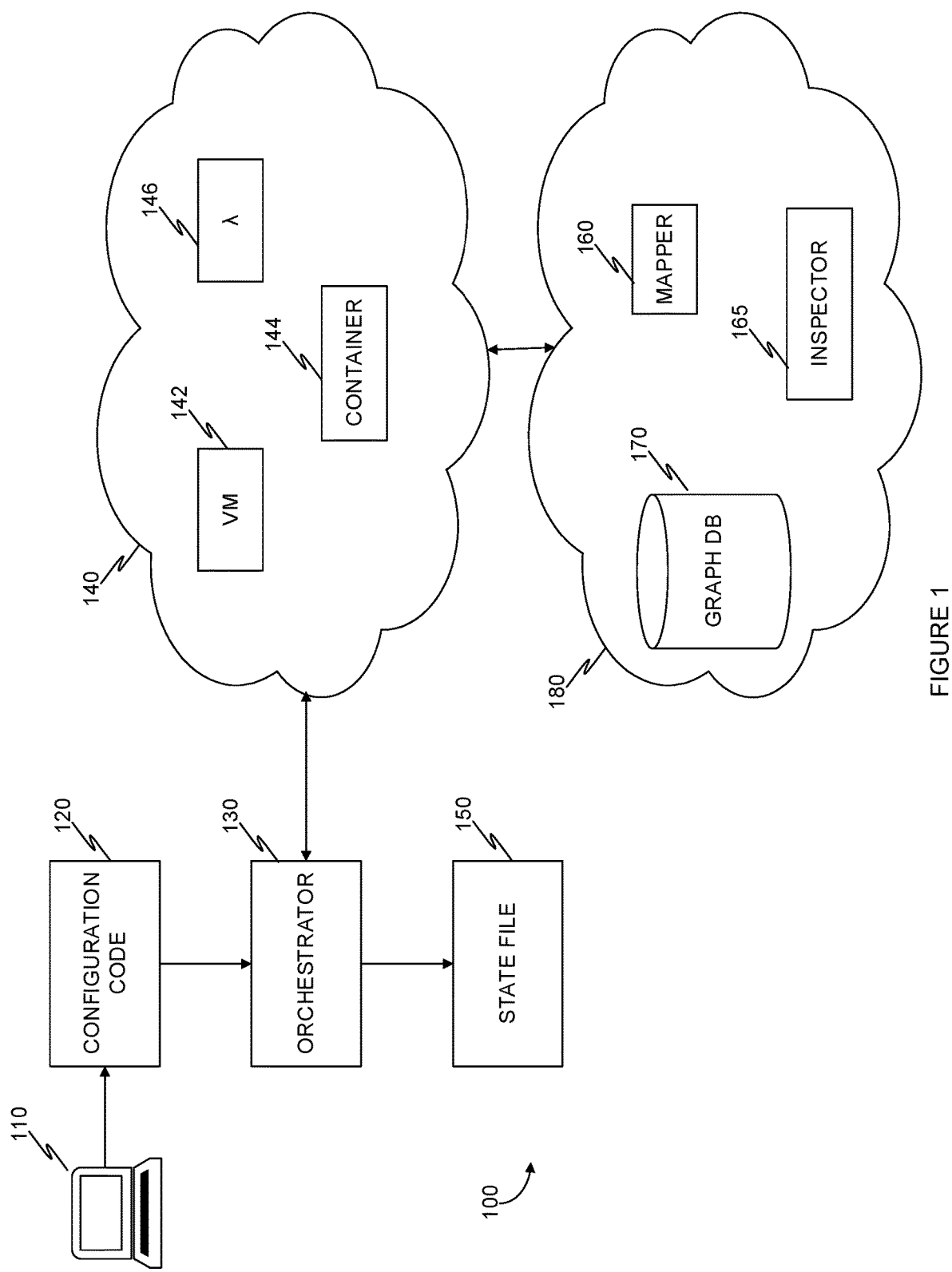
FIG. 1 is a network diagram of a cloud computing environment utilizing infrastructure as code (IaC), implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for detecting cybersecurity vulnerabilities in workloads deployed in a cloud computing environment based on code objects from an Infrastructure as Code (IaC) file.

Infrastructure as code (IaC) allows fast and reliable deployment of workloads, such as virtual machines, software containers, and serverless functions, in cloud computing environments. However, errors and vulnerabilities in code instructions may result in a compromised workload. For example, a code object may be used to generate multiple instances of a virtual machine. If the code object includes a vulnerability, each virtual machine generated based on the code object is deployed with that vulnerability. According to one aspect of the disclosure, a system is configured to detect a workload which includes a cybersecurity threat, such as an exposure, a vulnerability, a misconfiguration, and the like, and traces the workload to an object in a code file. In an embodiment, a state file which includes a plurality of code objects is accessed, and the code objects are represented in a security graph as nodes. A node representing a code object is connected to a node representing a deployed workload, where the deployed workload is deployed based on the code object.

In an embodiment, the trace is performed by traversing a security graph from a node representing a workload, to a node representing a code object, to another node representing another workload, which is connected to the node representing the code object. In certain embodiments the system is configured to perform mitigation in response to detecting a cybersecurity threat in the another workload. For example, a mitigation action may be to generate a notification to update a code object including a vulnerability. Similar workloads may be identified in this manner, by identifying other workloads which are deployed based on the same object.

This is advantageous, as it allows for example to reduce a number of workloads which are inspected for cybersecurity threats. By detecting a number of workloads which are all deployed from a single code object, it is possible to inspect one of the number of workloads, as each of the workloads is representative of the group of workloads. This reduction in inspection is advantageous as less compute resources are required for inspection, and efficiency is increased by utilizing the available resources for the services provided by the cloud computing environment, rather than for inspection. For example, if a plurality of web servers are deployed as virtual machines, inspecting all of them would result in a loss of capability to service a peak number of users, as at least the servers being inspected devote some of their compute resources to the inspection process. However, by inspecting only a single web server, that loss of servicing capability is reduced, without compromising the requirement for inspection for cybersecurity threats.

FIG. 1 is a network diagram 100 of a cloud computing environment utilizing infrastructure as code (IaC), implemented in accordance with an embodiment. In an embodiment, a client device 110 generates a configuration code file 120 based on input from one or more users. While a client device 110 is shown here for simplicity and pedagogical purposes, it should be readily apparent that the configuration code 120 may be generated by a client device 110, a virtual workload in a cloud environment, such as described in more detail below, and the like. A client device 110 may be, for example, a personal computer, a laptop, a tablet computer, a smartphone, and the like.

In an embodiment the configuration code file 120 is implemented in a declaratory computer language. In a declaratory computer language, a user declares as objects resources they would like to have. An orchestrator 130 of a cloud computing infrastructure is configured to deploy cloud entities, such as resources and principals, in a cloud environment based on the declaration code.

For example, a cloud computing infrastructure may be Amazon® Web Services (AWS) having an orchestrator which is configured to receive a Terraform® file including therein a plurality of code objects, each code object including instructions, which when executed in the cloud computing environment cause deployment of a cloud entity. A cloud entity may be a principal, a resource, and the like. A principal is a cloud entity which acts on a resource, and has permissions to initiate actions in the cloud computing environment. In an embodiment, a principal is a user account, service account, role, and the like. A resource is a cloud entity which provides a service, provisions a hardware resource (e.g., storage, memory, processing circuitry, and the like), or otherwise performs actions in a cloud computing environment. A resource may be, for example, a virtual machine, a serverless function, a software container, and the like. In an embodiment, a resource is an application, such as a web server, a load balancer, a gateway, a web application firewall (WAF), and the like.

In certain embodiments, multiple configuration code files 120 may be utilized. For example, a user may operate multiple cloud environments, each with its own configuration code. In an embodiment, a user can declare a first resource type for a first cloud environment and for a second cloud environment in a first configuration code file, and a second resource type for the first cloud environment and the second cloud environment in a second configuration code file. For example, a first configuration code file is utilized to deploy a virtual machine having installed thereon Apache® HTTP Server in an Amazon® Web Services (AWS) cloud environment and in a Google® Cloud Platform (GCP) cloud environment, while a second configuration code file is utilized to deploy a Kubernetes® Cluster in a GCP environment and in a Microsoft® Azure environment.

An orchestrator 130 is configured to receive the configuration code file 120. The orchestrator 130 configures the cloud computing environment 140 to deploy various instances based on the declarations of the configuration code file. In an embodiment, the cloud computing environment 140 is a virtual space, such as a virtual private cloud (VPC) or a Virtual Network (VNet) deployed on a cloud computing infrastructure, such as AWS, GCP, Azure, and the like. In an embodiment, an instance is a virtual workload (also referred to simply as 'workload'), and may be, for example a virtual machine 142, a software container 144, or a serverless function 146. A virtual machine 142 may be implemented as Oracle® VirtualBox. A software container 144 may be implemented for example utilizing a container engine, such as Kubernetes®, Docker®, and the like. A serverless function 146 may be, for example, an Amazon® Lambda instance.

In an embodiment the orchestrator 130 is configured to perform deployment of workloads by assigning (also known as provisioning) cloud resources, such as processors, memory, storage, etc. to a virtual instance.

In an embodiment the orchestrator 130 is further configured to generate a state file 150. The state file 150 stores data to associate objects from the configuration code file 120 to the workloads deployed in the cloud computing environment 140 by the orchestrator 130.

In some embodiments, a plurality of workloads may be associated with a first code object (not shown) of the configuration code file 120. This provides an advantage where it is required to deploy multiple instances which share similar configurations, such as web servers providing access to a website. Rather than configure each instance (e.g., each web server) manually and individually, the orchestrator 130 is able to deploy a predetermined number of the same instance based on a code object in the configuration code file 120. In an embodiment the state file 150 is stored in the cloud computing environment 140, for example in a memory or storage.

In some embodiments, the orchestrator 130 is configured to generate instructions based on a code object of a configuration code 120 for a cloud-native orchestrator (not shown) in the cloud computing environment 140; the generated instructions when executed by the cloud-native orchestrator cause deployment of workloads based on the generated instructions. This may be advantageous for example where instances need to be deployed in different cloud environments.

For example, the same instances may be deployed simultaneously on Google Cloud Platform (GCP), Amazon Web Services (AWS®), or Microsoft Azure® by configuring the orchestrator 130 to generate instructions for a cloud native orchestrator in each environment to deploy instances based on instructions generated by the orchestrator 130, which in turn are generated based on code objects declared in the configuration code file 120. This method of deploying instances in cloud computing environments decreases errors by eliminating the need for a user to manually configure each instance and initiate deployment separately, and is thus also a faster method of deployment.

In an embodiment, a mapper 160 is configured to communicate over a network with the cloud environment 140. In certain embodiments, the mapper 160 is implemented as a workload in the cloud computing environment 140. In some embodiments, multiple mappers may be implemented, each in a different cloud computing environment. In an embodiment the mapper 160 is configured to map workloads in the cloud computing environment 140 to nodes in a security graph, stored on a graph database 170. In an embodiment, where a single client utilizes different cloud environments, the mapper 160 may be deployed for each cloud environment, each mapper writing to a single security graph.

In certain embodiments, the mapper 160 may generate a security graph stored on the graph database 170 for each client, where a client corresponds to a user or group of users using at least a cloud computing environment. The mapper 160 is described in more detail below, for example in FIG. 5. The mapper 160 may be realized also a virtual entity. In some embodiments, the mapper 160 is configured to detect cloud entities, such as workloads, and generate a node representing the cloud entity in the security graph. In certain embodiments, the mapper 160 is configured to detect code objects in a configuration code 120 and map each code object to a workload (or plurality of workloads) deployed in the cloud computing environment 140. In some embodiments, mapping a code object includes generating a node in the security graph which represents the code object. The node representing the code object is connected to a node representing a workload which is deployed based on the code object.

In an embodiment, the mapper 160 and graph database 170 are implemented in an inspection environment 180. In some embodiments, the inspection environment 180 is implemented as a virtual private cloud (VPC). In an embodiment, the inspection environment 180 further includes a plurality of inspectors, such as inspector 165. An inspector 165 is configured, in an embodiment, to detect a cybersecurity threat. An inspector 165 may be implemented as a virtual workload, such as a virtual machine, a software container, a serverless function, and the like.

In an embodiment, a cybersecurity threat is, for example, a misconfiguration, a vulnerability, an exposure, a malware, a virus, a cryptominer, malicious code, a weak password, an exposed password, and the like. A misconfiguration may be, for example, a database management system configured to have no password protection.

In an embodiment, an inspector 165 is configured to access a disk of a workload and search the disk for security objects in order to determine if a cybersecurity threat is present on the disk, and therefore on the workload. A security object may be, for example, a password stored as cleartext, a password stored as plaintext, a certificate, a binary, a library, a file, a folder, and the like. In an embodiment, a check may be performed between the security object and a database of predefined cybersecurity threats to determine if a threat is present on the workload. For example, a checksum may be performed on a file detected on a disk of a virtual machine, the result of which is compared to a predetermined checksum result of a file which is known to have a certain malware.

Figure 2:
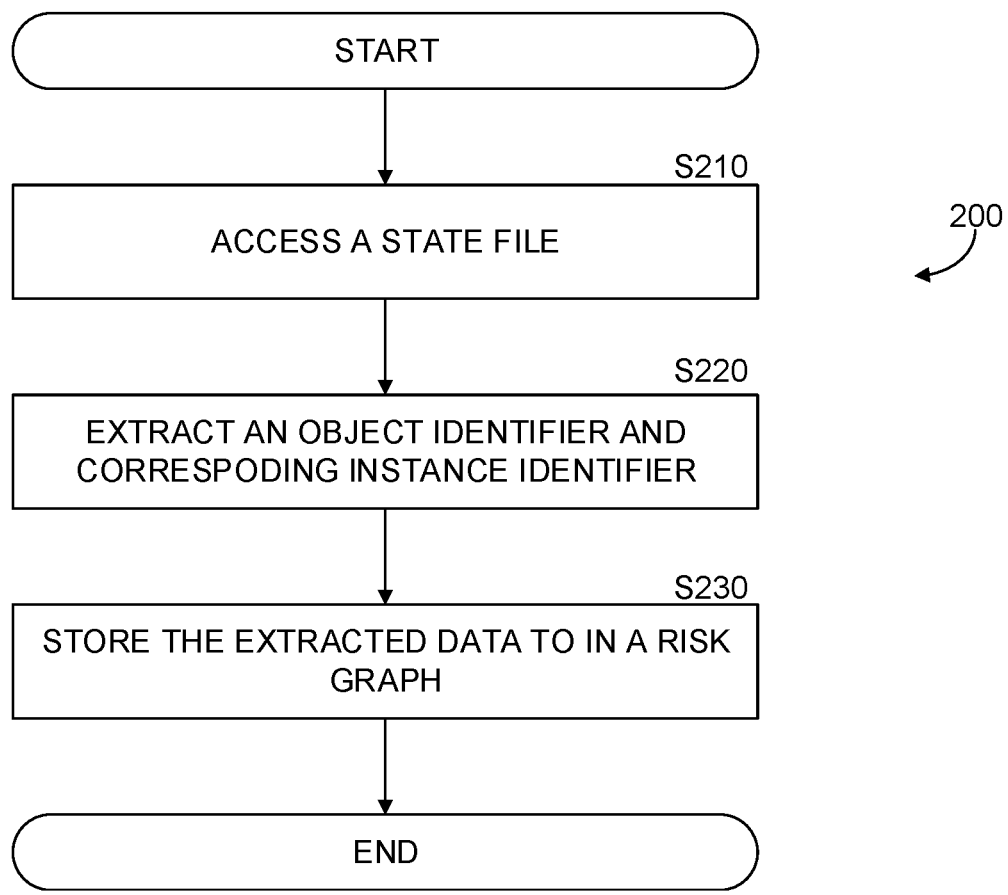
FIG. 2 is a flowchart of a method for mapping objects in declaratory code and corresponding workloads to nodes on a security graph, implemented in accordance with an embodiment.

FIG. 2 is an example flowchart 200 of a method for mapping objects in declaratory code and corresponding workloads to nodes on a security graph, implemented in accordance with an embodiment.

At S210, a state file is accessed. In an embodiment, a state file includes a mapping between a code object of a declaratory code and one or more instances in a cloud computing environment. For example, a virtual machine (VM) may be mapped to a first code object in the declaratory code, a first plurality of software container nodes may be mapped to a second code object in the declaratory code, and a second plurality of software container nodes may be mapped to a third object in the declaratory code.

In an embodiment, the state file may be implemented as, for example, a JSON file, generated by an orchestrator of the cloud computing environment. The state file includes a mapping between a code object and a deployed workload. For example, a mapping may include an identifier of a code object, paired with a unique identifier of a deployed workload, such as a name, network address, subnet address, and the like.

At S220, an instance identifier and corresponding object identifier are extracted from the state file. In an embodiment the state file is searched to detect an identifier of a deployed instance, where each deployed instance is associated with an object identifier which can be traced back to a code object in a declaratory code. An instance identifier may be a name in a namespace, network address, subnet address, other unique identifier, and the like. An object identifier may be an alphanumeric string, for example. In an embodiment a JSON file is searched for a predefined data field, such as type, value, path, version, id, attributes, and the like.

At S230, the extracted instance identifier and corresponding object identifier are stored on a graph database as a security graph. In an embodiment, a node is generated based on the instance identifier, to represent the instance. Another node is generated based on the object identifier to represent the code object. For example, a node may be generated which represents a virtual machine, and another node is generated to represent a code object from which the virtual machine is deployed. In an embodiment, the node representing the instance is further associated with metadata received from an application programming interface (API) of the cloud environment. Metadata may be, for example, name, operating system identifier, user identifier, and the like.

In an embodiment the node representing the instance is connected with a vertex to a node representing the code object, generated based on the object identifier. In certain embodiments, a plurality of nodes, each representing a unique instance, may be connected, each with a vertex, to a single node representing a code object, to indicate multiple instances which are deployed based on the same code object in a declaratory code.

Figure 3:
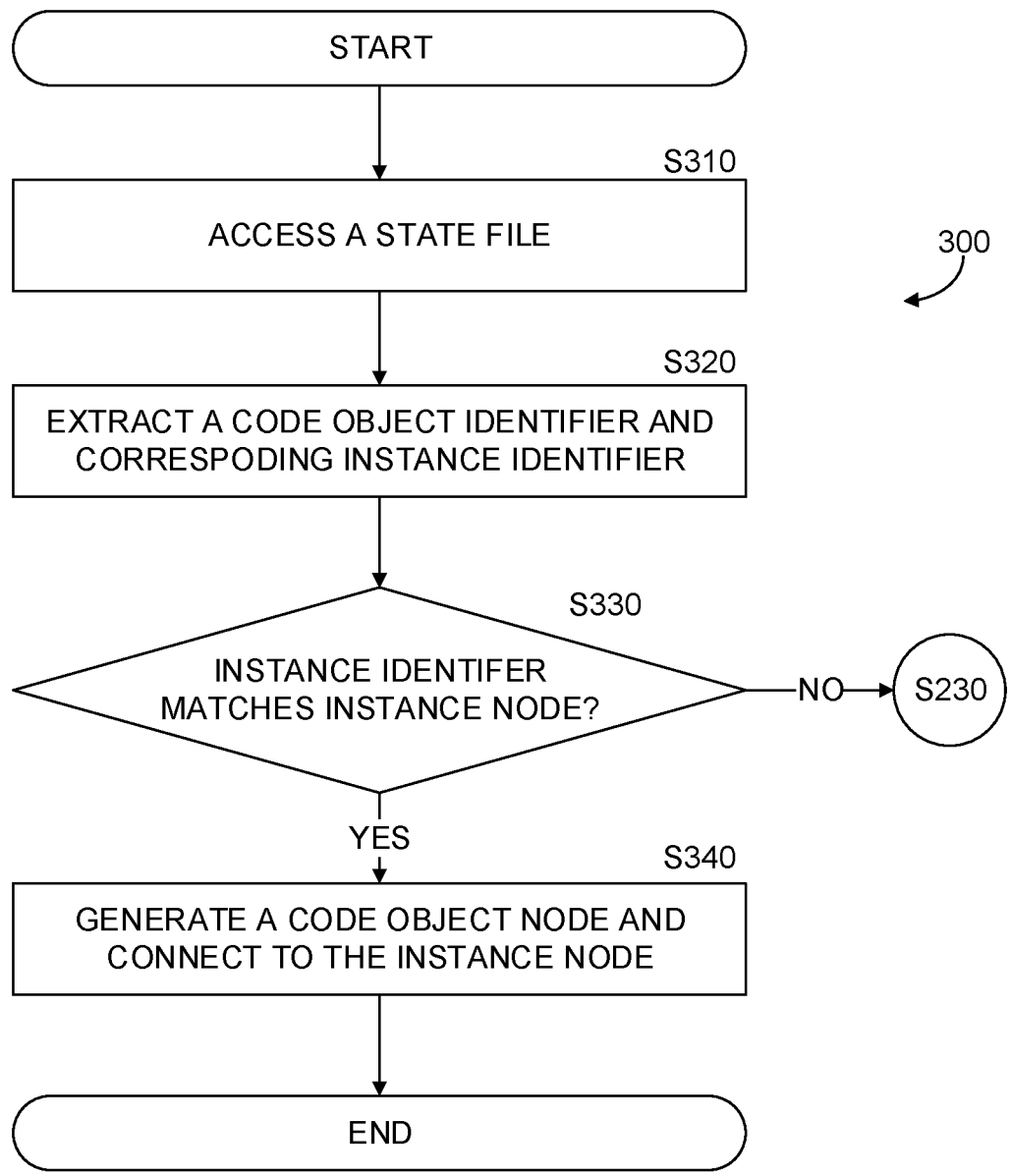
FIG. 3 is a flowchart of a method for mapping objects in declaratory code to existing instance nodes on a security graph, implemented in accordance with an embodiment.

FIG. 3 is an example flowchart 300 of a method for mapping objects in declaratory code to existing instance nodes on a security graph, implemented in accordance with an embodiment.

At S310, a state file is accessed. A state file, as noted above, includes a mapping between a code object of a declaratory code and one or more instances deployed in a cloud computing environment. For example, a VM is mapped to a first code object in the declaratory code, while a first plurality of software containers is mapped to a second code object of the declaratory code, and a second plurality of software containers are mapped to a third code object of the declaratory code.

In an embodiment, the state file is implemented as a JSON file, generated by an orchestrator. In certain embodiments the state file includes a plurality of code objects, each code object pointing to a declaration code, the declaration code when translated to instructions which are executed by an orchestrator configure the orchestrator to deploy cloud entities, such as resources, in a cloud computing environment. In certain embodiments, a plurality of state files are accessed.

At S320, an instance identifier and corresponding code object identifier are extracted from the state file. The state file may be searched to locate deployed instances, where each deployed instance is associated with a code object identifier which can be traced back to a code object in a declaratory code. An instance identifier may be a name in a namespace, network address, or other unique identifier. A code object identifier may be an alphanumeric string, for example.

At S330, a check is performed to determine if the extracted instance identifier matches a node representing the instance in a security graph. If yes' execution continues at S340. Otherwise, execution may continue at S230 of FIG. 2 above. It should be understood that the cloud computing environment may include instances which are not deployed based on declaratory code. In such embodiments, a determination may be performed to detect which instances of the cloud computing environment originate from code objects in a declaratory code, and which do not.

In such embodiments, an optimization notification may be further generated. An example of an optimization notification is to provide a suggestion that an instance should be deployed based on a code object of a declaratory code object. For example, instances may be clustered based on type (e.g., VM, container, etc.), access (specific ports, IP addresses, certificates, etc.), or function (load balancer, web server, etc.). In an embodiment a plurality of instances which are not deployed based on declaratory code are clustered, and an optimization notification may be generated to deploy the clustered instances from a code object in a declaratory code. For example, instances may be clustered based on certain predefined attribute values, range of values, and the like.

At S340, a node representing a code object is generated in the security graph. In an embodiment, the node is generated based on the code object identifier and connected with a vertex to the node representing the instance. In an embodiment, the node representing the code object is further associated with metadata. Metadata may be, for example, a name, an identifier, a data field value, and the like.

Figure 4:
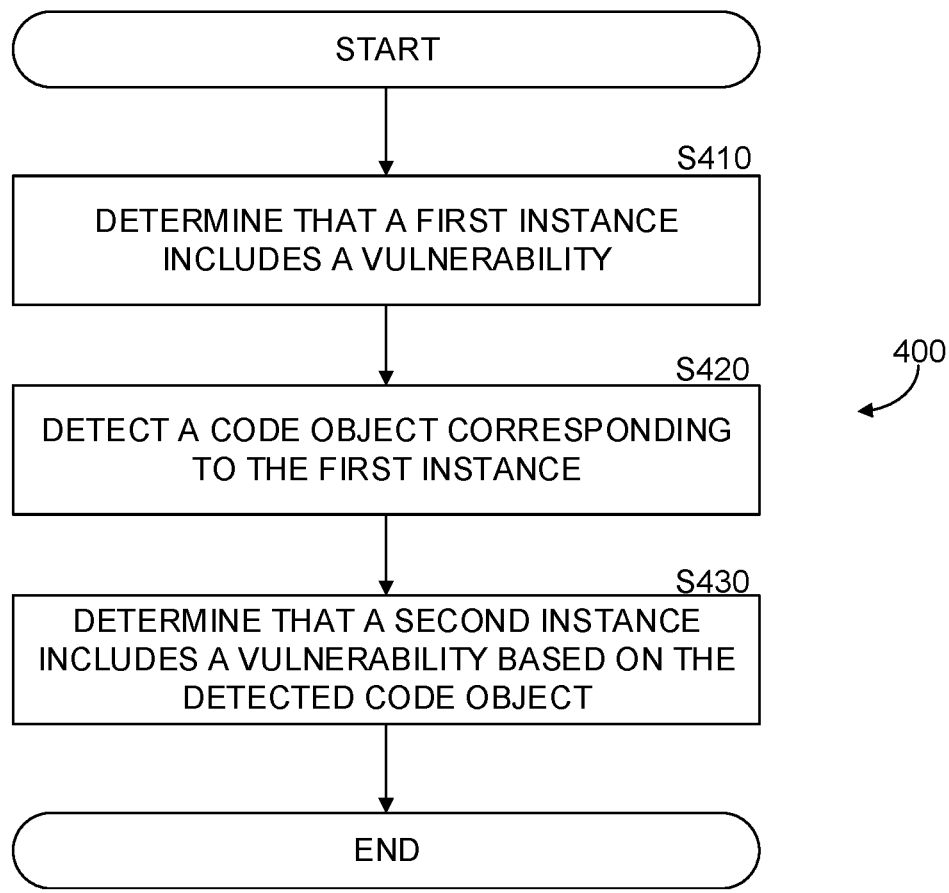
FIG. 4 is a flowchart of a method for detecting a vulnerability in a virtual instance deployed from a code object in a cloud computing environment, based on a security graph, implemented in accordance with an embodiment.

FIG. 4 is an example flowchart 400 of a method for detecting a vulnerability in a virtual instance deployed from a code object in a cloud computing environment, based on a security graph, implemented in accordance with an embodiment.

At S410, a first instance is determined to include a vulnerability. In an embodiment an instance is an application, such as a load balancer, web server, gateway and so on. In certain embodiments an instance is implemented as a virtual machine, a software container, a serverless function, and the like. A vulnerability may be, for example, a cybersecurity threat, an exposure, a misconfiguration, and the like. For example, an instance which is configured to allow unfettered network access, or is susceptible to a particular type of network-based attack, is a vulnerable instance. In an embodiment determining that a first instance includes a vulnerability includes determining that the instance executes or otherwise deploys an application or operating system version which is known to have certain unintended access routes. For example, a specific version of Linux® may be associated a vulnerability identified by the common vulnerability and exposure (CVE) database.

In an embodiment the first instance is associated with a node in the security graph. In certain embodiments, determining that a first instance includes a vulnerability is performed by querying a security graph stored on a graph database to detect the node representing the first instance, and determining if the node is connected to a node representing a vulnerability. Where a node representing an instance is connected to a node representing a vulnerability (or other cybersecurity threat), this represents that the instance includes the vulnerability.

At S420, a code object is detected from which the first instance is deployed. In an embodiment, a security graph is traversed to detect a node representing a code object which is connected to a node representing the first instance. A method of connecting a node representing a code object to a node representing a first instance is discussed in more detail above. In an embodiment, a node representing a code object includes metadata to identify the code object in a declaration code, state file, and the like. Metadata may be, for example, a name, an identifier, a data field value, and the like.

At S430, a second instance is determined to include the vulnerability. In an embodiment, determining that the second instance includes the vulnerability associated with the first instance includes identifying a node representing a code object which is connected to a node representing the first instance, and detecting another node which is connected to the node representing the code object, which is not the node representing the first instance.

In some embodiments, a plurality of instances may be determined to include a vulnerability, based on each instance being represented by a node which is connected to a node representing a code object, wherein the node representing a code object is connected to a node representing an instance which in turn is connected to a node representing a vulnerability. This is advantageous as it allows to rapidly detect (and therefore repair) vulnerabilities across multiple instances in a production environment (i.e., deployed instances) without having to inspect each individual instance for known vulnerabilities. This reduces the compute resources required for inspection, as inspecting a single instance requires less compute resources than are required for inspecting a plurality of instances.

Figure 5:
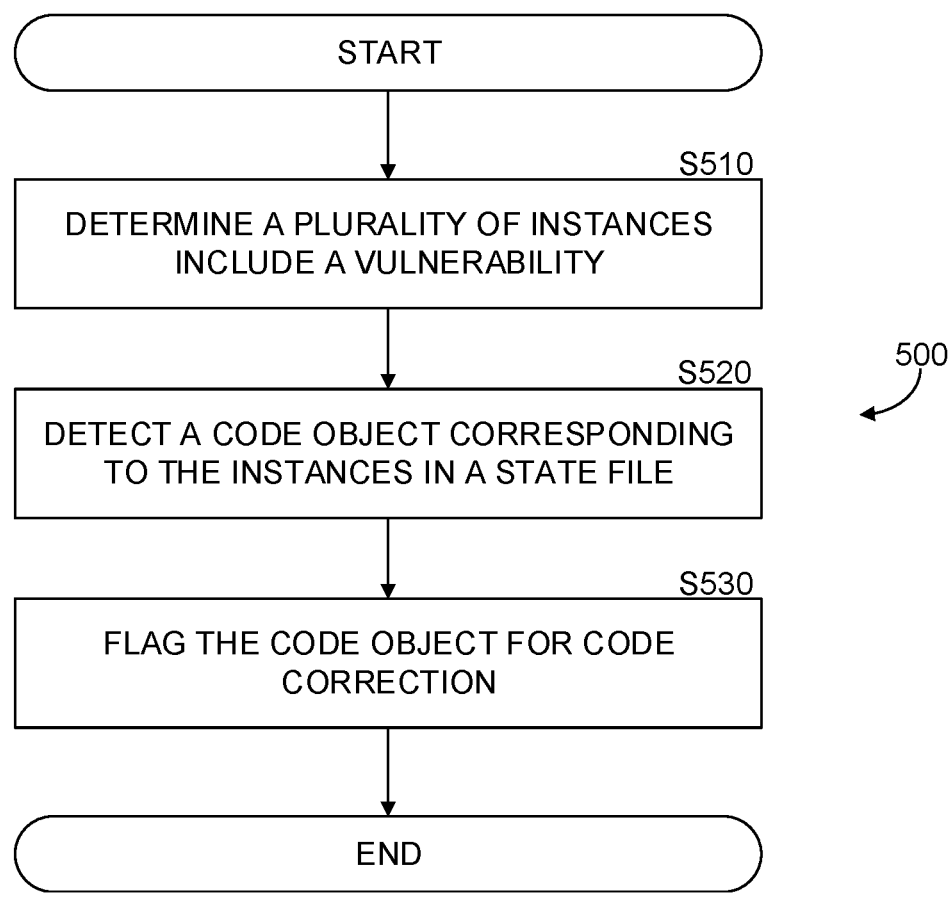
FIG. 5 is a flowchart of a method for detecting based on a security graph, a code object from which vulnerable virtual instances are deployed in a cloud computing environment, implemented in accordance with an embodiment.

FIG. 5 is an example flowchart 500 of a method for detecting based on a security graph, a code object from which vulnerable virtual instances are deployed in a cloud computing environment, implemented in accordance with an embodiment.

At S510, a plurality of instances are determined to include a vulnerability. In an embodiment, a vulnerability is a cybersecurity threat. A cybersecurity threat is, for example, a misconfiguration, an exposure, a malware, a virus, a cryptominer, malicious code, a weak password, an exposed password, and the like. A misconfiguration may be, for example, a database management system configured to have no password protection. In an embodiment the included vulnerability is the same vulnerability for each instance of the plurality of instances. For example, a plurality of virtual machines each include an outdated software application which does not have a security patch.

An instance (also referred to as a virtual instance or workload) is, in an embodiment, a virtual machine, a software container, a serverless function, and the like. In an embodiment an instance includes an application such as a load balancer, web server, and so on. A vulnerability may be, for example, an instance which allows unfettered network access, or is susceptible to a particular type of network-based attack. Determining that an instance includes a vulnerability includes, in an embodiment, that a node representing the instance is connected to a node representing a vulnerability.

A connection between a node representing the instance and the node representing the vulnerability may be generated for example in response to inspecting the instance and determining based on the inspection that the instance includes the vulnerability. A vulnerability may be, for example, determining that the instance executes an application or operating system version which is known to have certain unintended access routes. In an embodiment each instance of the plurality of instances is each represented by a node in the security graph, where the security graph includes a representation of the cloud computing environment in which the plurality of instances are deployed. In other embodiments, the security graph includes a representation of each cloud computing environment in which each of the plurality of instances are deployed.

At S520, a code object is detected. In an embodiment, a security graph is traversed to detect a node representing a code object which is connected to at least a first node and a second node, each representing an instance of the plurality of instances. In an embodiment, the group contains two or more nodes, each node representing a unique instance.

At S530, a flag is generated for each node connected to the node representing the code object. In an embodiment, a mitigation action is executed in response to generating the flag. For example, a mitigation action includes generating a notification based on the generated flag to notify a user that a vulnerability which exists in a group of instances can be rectified by updating the code of the code object. This is advantageous as it allows to rapidly repair vulnerabilities across multiple instances in a production environment (i.e., deployed instances).

In certain embodiments, the mitigation action includes providing alternate code which can repair the vulnerability. In an embodiment the alternate code is preprogrammed and provided based on a rule-based system. For example, a rule may state that if a vulnerability is due to an operating system or application being out of date (e.g., detecting a version number, comparing to a recent version number, and determining if an update is required based on the comparison), the alternate code is generated to include an instruction which when executed causes the operating system or application to update to a recent version. In some embodiments, a connection is generated, for example by an edge, between a node representing a cybersecurity threat (or vulnerability) and a node representing a code object, to indicate that the code object is a source of the cybersecurity threat. This allows to represent that an instance which is generated based on the code object will be deployed with an included cybersecurity threat.

Figure 6:
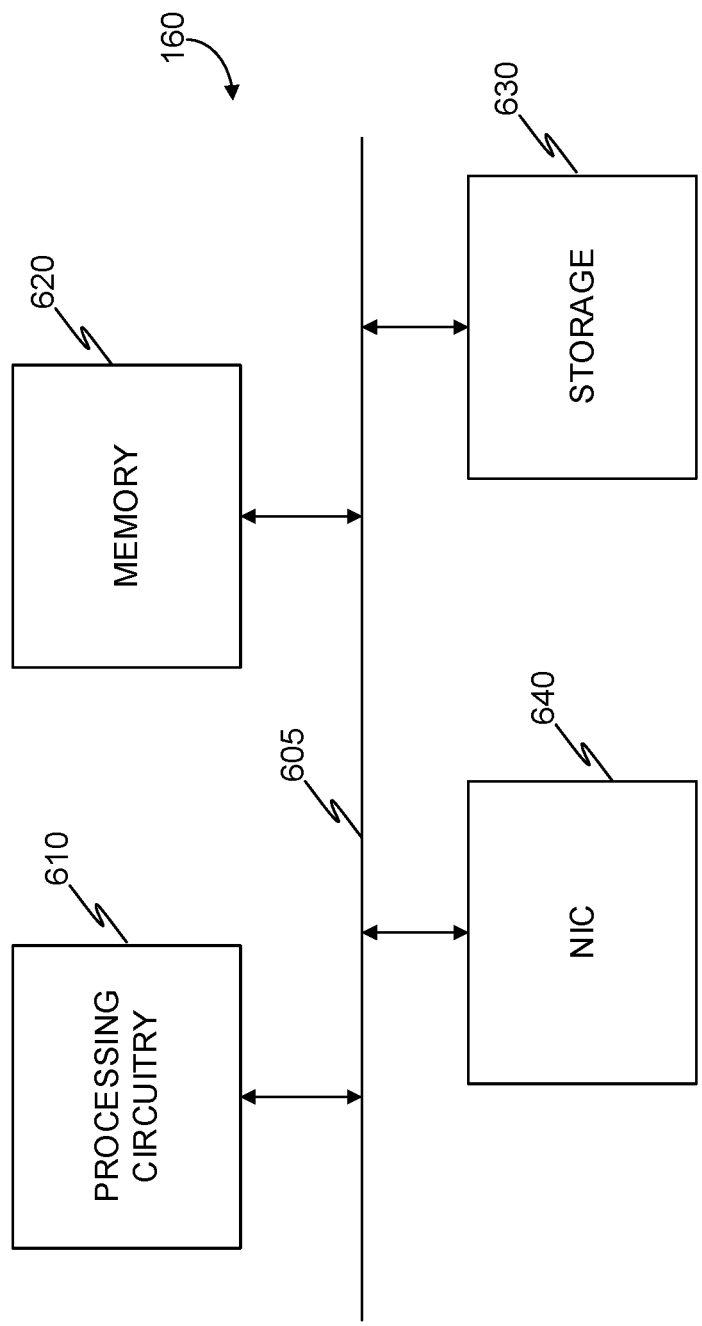
FIG. 6 is a schematic diagram of a mapper according to an embodiment.

FIG. 6 is an example schematic diagram of a mapper 160 according to an embodiment. The mapper 160 includes a processing circuitry 610 coupled to a memory 620, a storage 630, and a network interface 640. In an embodiment, the components of the mapper 160 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, or any other medium which can be used to store the desired information.

The network interface 640 allows the mapper 160 to communicate with, for example, the inspector 165, the graph database 170, and the like.

It should be understood that the embodiments described herein are not limited to the specific architecture illustrated in FIG. 6, and other architectures may be equally used without departing from the scope of the disclosed embodiments.

Furthermore, in certain embodiments the inspector 165 may be implemented with the architecture illustrated in FIG. 6. In other embodiments, other architectures may be equally used without departing from the scope of the disclosed embodiments.

Figure 7:
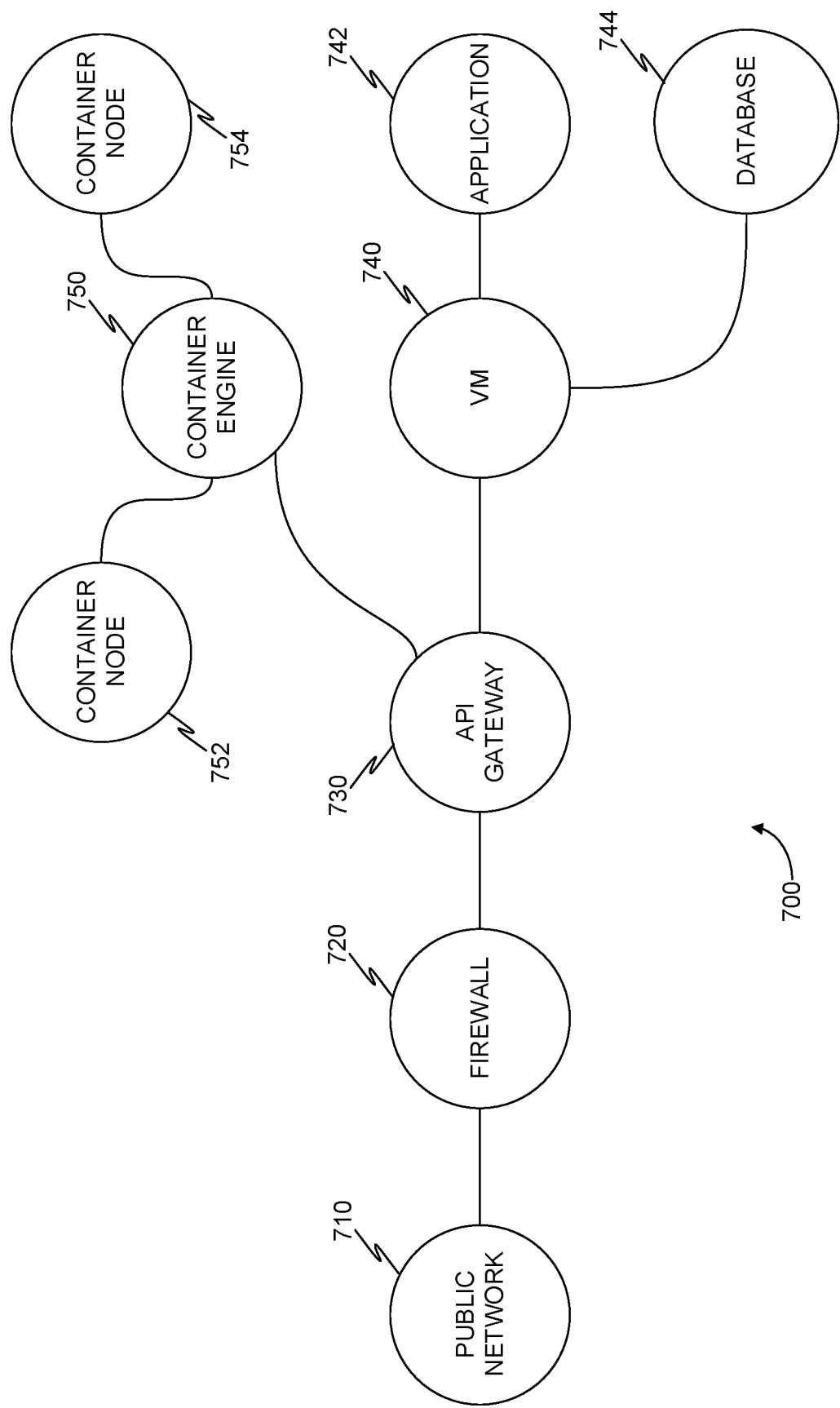
FIG. 7 is a security graph representing a cloud computing environment, implemented in accordance with an embodiment.

FIG. 7 is an example of a security graph 700 representing a cloud computing environment, implemented in accordance with an embodiment. The security graph 700 includes a plurality of nodes, each node connected to at least another node by an edge. In certain embodiments, a pair of nodes may be connected by a plurality of edges. In some embodiments, each edge may indicate a type of connection between the nodes. For example, an edge may indicate a "can access", to indicate that a cloud entity represented by a first node can access the cloud entity represented by a second node.

A first enrichment node 710 (also referred to as public network node 710) represents a public network. An enrichment node, such as enrichment node 710, is a node generated based off of insights determined from data collected from a computing environment, such as the cloud computing environment 140 of FIG. 1 above. In an embodiment a vulnerability, a cybersecurity threat, a misconfiguration, an exposure, and the like, are ach represented by an enrichment node. By connecting nodes in the security graph 700 which represent, for example an instance (i.e., workload), to an enrichment node representing a vulnerability, the security graph 700 indicates that the instance includes the vulnerability. This allows a compact representation as the security graph 700 does not redundantly store multiple data fields of the same vulnerability in each node representing a resource affected for example by the vulnerability.

The public network node 710 is connected to a first instance node 720 (also referred to as firewall node 720) representing a firewall workload. The firewall represented by the firewall node 720 may be implemented, for example, as a virtual machine in the first cloud computing environment. Connecting the public network node 710 to the firewall node 720 by an edge in the security graph 700 represents that the firewall is open to transmitting and receiving communication between itself and the public network, for example through a port, such as port 80.

The firewall node 720 is further connected to a second instance node 730 (also referred to as API gateway node 730) which represents an API (application programming interface) gateway. An API gateway is an instance, such as a serverless function, which acts as a reverse proxy between a client and resources, accepting API calls, directing them to the appropriate service, instance, workload, resource, etc. and returning a result to the client when appropriate.

The API gateway node 730 is connected to a third instance node 740 (also referred to as VM node 740) representing a virtual machine (VM) hosting an application and a database, and is also connected to a fourth instance node 750 (also referred to as container engine node 750) which hosts a plurality of container nodes. The VM node 740 is connected to an application node 742, and a database node 744. The application node 742 may indicate, for example, that a certain application, having a version number, binaries, files, libraries, and the like, is executed on the VM which is represented by the VM node 740.

In an embodiment, the VM node 740 may be connected to a plurality of application nodes. The database node 744 represents a database which is stored on the VM (represented by VM node 740) or stored on a storage accessible by the VM. The database node 744 may include attributes which define a database, such as type (graph, columnar, distributed, etc.), version number, query language, access policy, and the like.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for detecting a vulnerable workload deployed in a cloud computing environment based on a code object of an infrastructure as code (IaC) file utilizing a security graph, comprising:
   extracting a code object, of a deployment code, from a state file, the state file including a mapping between the code object to a first workload deployed in the cloud computing environment and a second workload deployed in the cloud computing environment;
   generating a node representing the code object in the security graph, wherein the security graph includes a representation of the cloud computing environment;
   generating a connection in the security graph between the node representing the code object and a node representing the first workload;
   generating a connection in the security graph between the node representing the code object and a node representing the second workload;
   inspecting the first workload to detect a cybersecurity threat;
   generating a node representing the cybersecurity threat in the security graph;
   generating a connection in the security graph between the node representing the cybersecurity threat and the node representing the first workload; and
   determining that the second workload is a vulnerable workload which includes the cybersecurity threat, in response to detecting that the first workload node is associated with the cybersecurity threat, and that the node representing the second workload and the node representing the first workload are each connected to the node representing the code object.

2. The method of claim 1, further comprising:
   detecting a plurality of nodes connected to the node representing the cybersecurity threat, each node of the plurality of nodes representing a workload deployed in the cloud computing environment;
   detecting a group of nodes of the plurality of nodes, each node of the group having a common value of an attribute; and
   detecting a node representing a code object connect to each node of the group of nodes.

3. The method of claim 2, further comprising:
   generating a notification to indicate that each workload representing by a node of the group of nodes includes the cybersecurity threat.

4. The method of claim 3, further comprising:
   generating a mitigation action based on the code object.

5. The method of claim 4, wherein the mitigation action includes a preprogrammed code to replace a portion of code in the code object.

6. The method of claim 2, further comprising:
   determining that the code object includes a cybersecurity threat in response to traversing the graph and determining that the node representing the code object is connected to each node of the group of nodes.

7. The method of claim 6, further comprising:
   generating a connection between the node representing the code object and the node representing the cybersecurity threat.

8. The method of claim 1, further comprising:
   searching a state file for a predetermined data field, the predetermined data field indicating that code object.

9. A non-transitory computer readable medium having stored thereon instructions for causing a processing circuitry to execute a process, the process comprising:
   extracting a code object, of a deployment code, from a state file, the state file including a mapping between the code object to a first workload deployed in a cloud computing environment and a second workload deployed in the cloud computing environment;
   generating a node representing the code object in a security graph, wherein the security graph includes a representation of the cloud computing environment;
   generating a connection in the security graph between the node representing the code object and a node representing the first workload;
   generating a connection in the security graph between the node representing the code object and a node representing the second workload;
   inspecting the first workload to detect a cybersecurity threat;
   generating a node representing the cybersecurity threat in the security graph;
   generating a connection in the security graph between the node representing the cybersecurity threat and the node representing the first workload; and determining that the second workload is a vulnerable workload which includes the cybersecurity threat, in response to detecting that the first workload node is associated with the cybersecurity threat, and that the node representing the second workload and the node representing the first workload are each connected to the node representing the code object.

10. A system for detecting a vulnerable workload deployed from an object in code in a cloud computing environment, comprising:
a processing circuitry; and
a memory, the memory containing instructions that, when executed by the processing circuitry, configure the system to:
extract a code object, of a deployment code, from a state file, the state file including a mapping between the code object to a first workload deployed in the cloud computing environment and a second workload deployed in the cloud computing environment;
generate a node representing the code object in a security graph, wherein the security graph includes a representation of the cloud computing environment;
generate a connection in the security graph between the node representing the code object and a node representing the first workload;
generate a connection in the security graph between the node representing the code object and a node representing the second workload;
inspecting the first workload to detect a cybersecurity threat;
generating a node representing the cybersecurity threat in the security graph;
generating a connection in the security graph between the node representing the cybersecurity threat and the node representing the first workload; and
determine that the second workload is a vulnerable workload which includes the cybersecurity threat, in response to detecting that the first workload node is associated with the cybersecurity threat, and that the node representing the second workload and the node representing the first workload are each connected to the node representing the code object.

11. The system of claim 10, wherein the memory contains further instructions that when executed by the processing circuitry, further configure the system to:
detect a plurality of nodes connected to the node representing the cybersecurity threat, each node of the plurality of nodes representing a workload deployed in the cloud computing environment;
detect a group of nodes of the plurality of nodes, each node of the group having a common value of an attribute; and
detect a node representing a code object connect to each node of the group of nodes.

12. The system of claim 11, wherein the memory contains further instructions that when executed by the processing circuitry, further configure the system to:
generate a notification to indicate that each workload representing by a node of the group of nodes includes the cybersecurity threat.

13. The system of claim 12, wherein the memory contains further instructions that when executed by the processing circuitry, further configure the system to:
generate a mitigation action based on the code object.

14. The system of claim 13, wherein the mitigation action includes a preprogrammed code to replace a portion of code in the code object.

15. The system of claim 11, wherein the memory contains further instructions that when executed by the processing circuitry, further configure the system to:
determine that the code object includes a cybersecurity threat in response to traversing the graph and determining that the node representing the code object is connected to each node of the group of nodes.

16. The system of claim 15, wherein the memory contains further instructions that when executed by the processing circuitry, further configure the system to:
generate a connection between the node representing the code object and the node representing the cybersecurity threat.

17. The system of claim 10, wherein the memory contains further instructions that when executed by the processing circuitry, further configure the system to:
search a state file for a predetermined data field, the predetermined data field indicating that code object.

* * * * *